United States Patent

[11] 3,576,345

| [72] | Inventors | Charles Haddad<br>Allen Park;<br>Theodore R. Lent-Koop, Dearborn; Robert<br>W. Riley, Taylor, Mich. |
|---|---|---|
| [21] | Appl. No. | 818,589 |
| [22] | Filed | Apr. 23, 1969 |
| [45] | Patented | Apr. 27, 1971 |
| [73] | Assignee | Ford Motor Company<br>Dearborn, Mich. |

[54] VEHICLE SEAT ASSEMBLY
2 Claims, 5 Drawing Figs.

[52] U.S. Cl. .................................... 297/326,
248/398
[51] Int. Cl. .................................... B60n 1/08,
B60n 1/02
[50] Field of Search .......................... 297/322,
329, 379, 270, 269, 326, 336, 458, 460; 248/393,
398, 429, 424, 382

[56] References Cited
UNITED STATES PATENTS

| 2,605,813 | 8/1952 | Seitz | 248/382 |
| 2,559,548 | 7/1951 | Seigneur | 297/379 |
| 3,135,549 | 6/1964 | Larsson | 297/326 |
| 3,362,746 | 1/1968 | Huyge | 297/344 |

Primary Examiner—Reinaldo P. Machado
Attorneys—John R. Faulkner and John J. Roethel ABSTRACT: A vehicle seat assembly having a contoured tubular frame pivotally supported on upper slidable members of spaced seat track units. The locus of the pivot axis is normal to the direction of movement of the seat on the track units and forward of the center of gravity of the occupied seat so that the latter tends to tilt rearwardly. Stop means determine the at rest tilted position and releasable latch means holds the seat against the stop means.

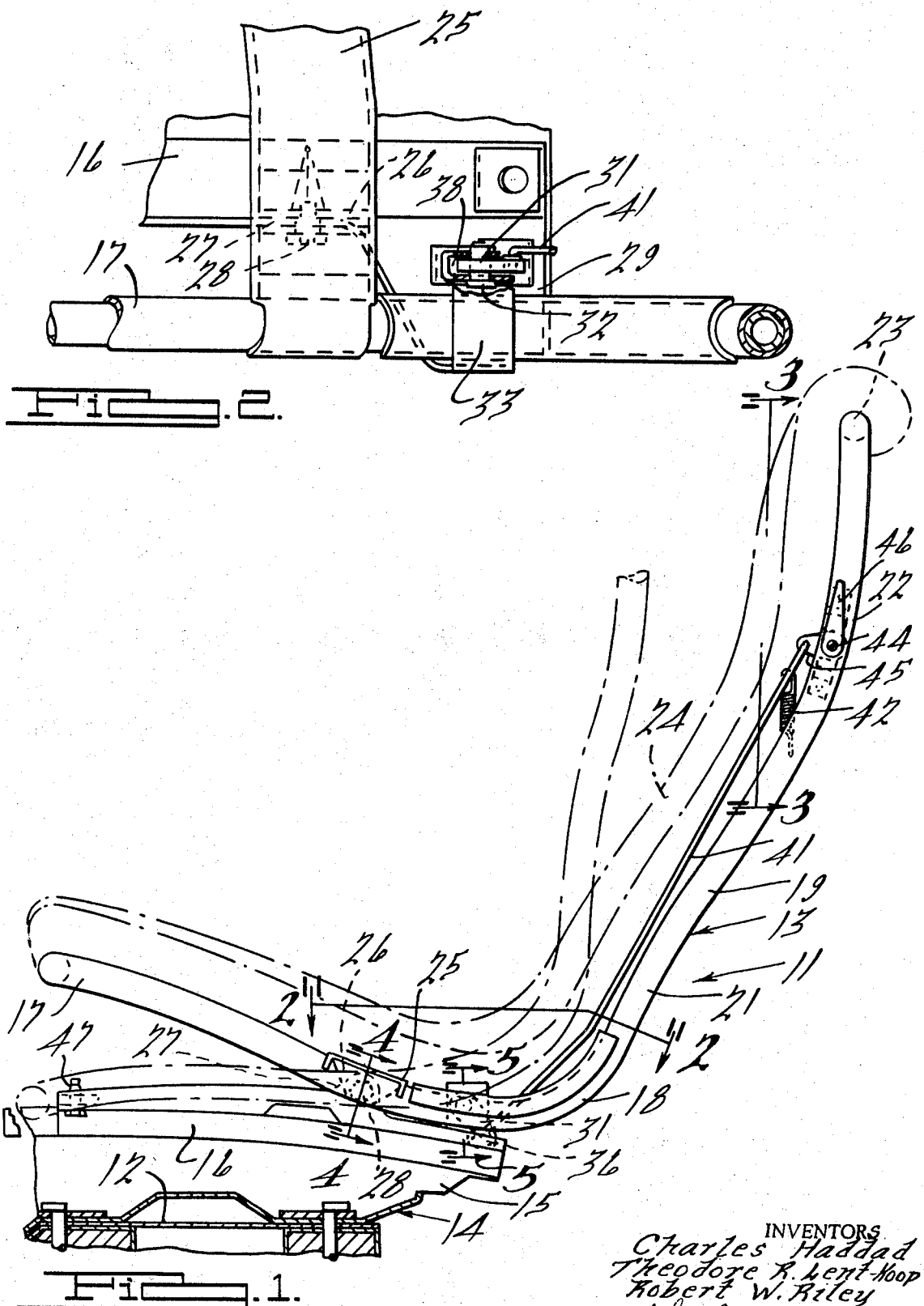

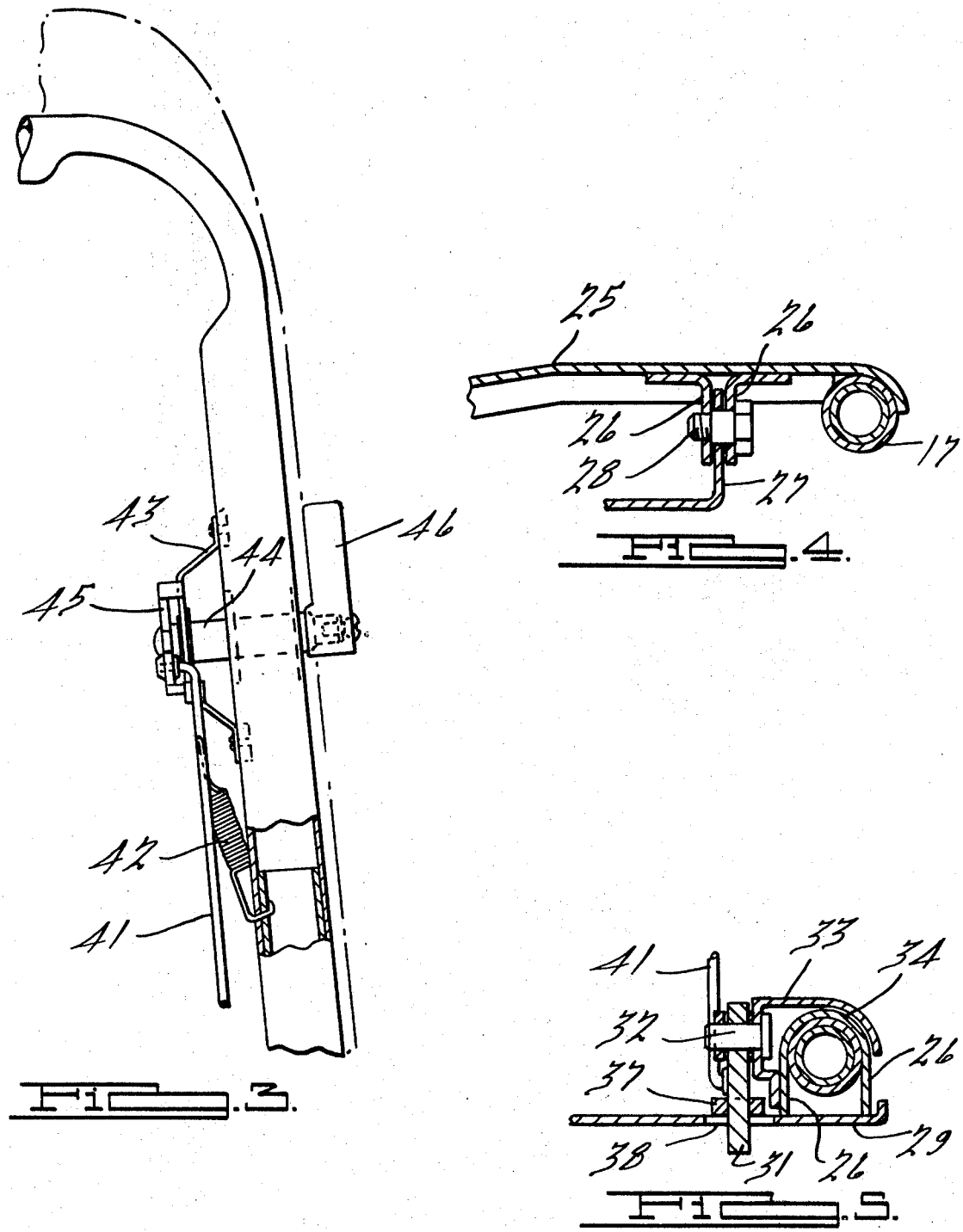

3,576,345

1

VEHICLE SEAT ASSEMBLY

BACKGROUND OF THE INVENTION

Revived interest in compact and subcompact vehicles has made it necessary for vehicle package engineers to reexamine the available seat structures. Such vehicles require a low cost, human engineered, contour bucket seat. The seat must be constructed and arranged to provide improved access to the rear seat area of two-door model vehicles which is the most common body style for the compact and subcompact vehicles.

SUMMARY OF THE INVENTION

The vehicle bucket seat assembly embodying the present invention comprises a pair of seat track units mounted in spaced parallel relationship to each other on a vehicle body floor. The seat track units have conventional upper movable slide members. The vehicle bucket seat assembly also includes a seat frame comprising a tubular structure formed to provide a curved seat configuration portion blending into an upstanding backrest portion. The backrest portion at its base has a forwardly extending curved lumbar support portion blending into an inversely curved upper torso receiving portion terminating in its upper section in a crossbar. The seat frame is pivotally supported on the seat track units for movement about a pivot axis normal to the direction of movement of the movable slide members, suitable pivot means coupling the seat frame to the movable slide members. The pivot axis has a locus forwardly of the center of gravity of the seat when occupied. The displacement of the center of gravity from the pivot axis creates a torque rotating the seat in a direction to tilt the seat backrest portion toward the floor. Suitable stop means limits the rotation of the seat in seat backrest tilting direction and releasable latch means hold the seat against the stop means until it is desired to tilt the seat forwardly to permit access to the area behind the seat.

DESCRIPTION OF THE DRAWINGS

Other objects, advantages and features of the present invention can be made more apparent as this description proceeds, reference being had to the accompanying drawings wherein:

FIG. 1 is a side elevation of the vehicle bucket seat assembly embodying the present invention with part of the vehicle floor being shown in section;

FIG. 2 is a section view on the line 2—2 of FIG. 1;

FIG. 3 is a view in part sectional on the line 3—3 of FIG. 1;

FIG. 4 is a section view on the line 4—4 of FIG. 1; and

FIG. 5 is a section view on the line 5—5 of FIG. 1.

DETAILED DESCRIPTION OF THE INVENTION

Referring now to the drawings, and more particularly to FIG. 1, there is illustrated a vehicle bucket seat assembly generally designated 11 adapted to be mounted on the floor 12 of the passenger compartment of a vehicle body. The seat assembly comprises a tubular seat frame, generally designated 13, mounted on spaced parallel seat track units 14 (only one of which is visible).

The seat track units 14 are conventional and comprise base sections 15 bolted to the vehicle floor 12. Upper movable slide members 16 are supported on the base section 15 for fore and aft movement and are held in adjusted positions by a suitable latch mechanism (not shown). Reference may be had to U.S. Pat. No. 3,001,835 for a typical seat track unit that could be utilized as a component of the vehicle seat assembly herein disclosed.

The seat frame structure 13 is shown in profile in FIG. 1 and only one side of the structure is visible. It will be understood, however, that both sides of the seat structure are alike. The seat frame structure 13 comprises a structure formed of tubular material. It has slightly upwardly arched side rail sections 17 forming a curved seat configuration portion. The side rails 17 blend into reversely curved juncture sections 18 integrally connected to substantially upstanding side rails 19 forming the backrest configuration. The side rails 19 contiguous the juncture sections 18 have forwardly arched sections 21 forming a lumbar support configuration. Above the lumbar support sections 21 the side rail sections 22 are reversely or rearwardly arched or curved to provide a seat occupant upper torso receiving portion. The upstanding side rails 19 are joined at the top by a cross bar 23 which, as viewed in FIG. 1, projects forwardly of the rearwardly inclined plane of the side rails 19 so as to provide a base for an integral headrest cushion.

The seat frame structure 13 is illustrated, in dot and dash outline, as being covered by a cushion structure 24 contoured to follow the contour of the integral tubular side rail sections 17, 18 and 19. The method of attachment of the cushion to the rails forms no direct part of the present invention.

The seat frame structure 13 is supported on the upper slide member 16 of the seat track units 15 for pivotal movement about a pivot axis extending in a direction normal to the fore and aft direction of movement of slide members 16. As best seen in FIGS. 2 and 4, the seat frame structure includes a channel member 25 that spans the distance between the tubular side rails 17. Depending from the underside of the channel member 25 are a pair of right angle brackets 26 which span an upstanding flange 27 projecting upwardly from the upper slide member 16. A shoulder bolt 28 functions as the pivot member.

As will be noted from FIGS. 2 and 4, the seat track units are located inwardly of the outer edges of the seat frame structure since it is desirable for appearance reasons that the seat track units be concealed beneath the seat.

In FIG. 1 the seat structure 13 is shown in solid outline in normal passenger receiving position. The seat configuration defined by the side rails 17 has a rearwardly declining slope and the seat back configuration defined by the upstanding side rails 19 has a rearward tilt. The locus of the pivot axis through the bolts 28 lies forwardly of the center of gravity of the seat and its occupant. This displacement of the center of gravity of the seat and its occupant creates a torque which, if unrestrained, would rotate the seat in a direction to tilt the backrest portion 13 toward the floor 12.

Control of the degree of rearward tilt of the seat is achieved through a stop plate 29 (see FIG. 2) which extends laterally outwardly from the rear end of the upper slide member 16 to underlie the rear end of the seat side rail 17. As has been explained, duplicate structure is to be found on the other side of the seat assembly.

The seat structure 11 is releasably held by a latch mechanism against forward tilting motion about the pivot axis, such as might occur because of inertia forces on the seat structure and its occupant during vehicle deceleration. The latch mechanism comprises a latch element 31 pivotally supported on a pivot stud 32 carried on a bracket 33. The bracket 33 includes a U-shaped member 34 straddling the seat side rails 17. The member 34 has depending legs 35 which are positioned to abut the upper surface of the stop plate 29, thus functioning as part of the stop means limiting the rearward tiltability of the seat structure.

The latch element 31 has a hook 36 on its free end engageable with a striker element 37 positioned at one edge of an aperture 38 in the stop plate 29. The latch element 31 is coupled to a release lever assembly 39 pivotally mounted at a convenient height on the backrest side rail 19. The coupling element is a link 41 which is biased by a tension spring 42 in a direction to urge the link 41 and thereby the latch element 31 in latching direction at all times.

The release lever assembly 39 comprises a bracket 43 mounted on the side rail 19, a pivot stud 44 projecting through the side rail 19 and carrying at one end a lever 45 and at its other end a handle 46 (see FIG. 3).

The purpose in providing the releasable latch means is so that the seat structure can be tilted forwardly against stop 47 which has the effect of increasing the access area to the rear seat of the vehicle. This is particularly necessary in two-door vehicles since the length of the side door is usually not great enough to permit direct access to the rear seat.

We claim:

1. A vehicle bucket seat assembly for a vehicle body having a passenger supporting floor, comprising:
   seat track units mounted in spaced parallel relationship on the vehicle body floor,
   said seat track units having upper movable slide members;
   a seat frame comprising a tubular structure having slightly upwardly arched seat side rails formed to provide a curved seat configuration,
   the seat side rails blending into reversely curved juncture sections integrally connected to substantially upstanding side rails forming a contoured backrest,
   the upstanding side rails contiguous the juncture sections having forwardly arched sections forming a lumbar support area as part of the contoured backrest,
   and above the forwardly arched sections the upstanding side rails having reversely curved sections to provide a seat occupant torso receiving area,
   the upstanding side rails being joined at the top of the backrest by a cross bar that projects forwardly of the rearwardly inclined plane of the upstanding side rails to provide a base for an integral head rest cushion;
   pivot means pivotally supporting said seat frame on the seat track upper movable slide members for movement about a pivot axis normal to the direction of movement of said movable slide members,
   said pivot axis having a locus forwardly of the center of gravity of the seat when occupied with the displacement of the center of gravity from the pivot axis creating a torque rotating the seat in a direction to tilt the seat backrest portion toward the floor,
   stop means limiting the rotation of said seat in seat backrest tilting direction,
   and releasable latch means holding said seat against the stop means.

2. A vehicle bucket seat assembly according to claim 1, in which:
   the pivot axis of the pivot means supporting the seat is located intermediate the forward edge of the latter and the backrest portion,
   said pivot axis being closer to the backrest portion of the seat then to the forward edge of the seat portion.